UNITED STATES PATENT OFFICE.

DESIDER FORSTER AND PHILIPP FINITZER, OF BUDAPEST, AUSTRIA-HUNGARY.

PROCESS OF FERMENTATION FOR USE IN MANUFACTURE OF YEAST AND SPIRIT.

978,282. Specification of Letters Patent. Patented Dec. 13, 1910.

No Drawing. Application filed June 9, 1909. Serial No. 500,996.

*To all whom it may concern:*

Be it known that we, DESIDER FORSTER and PHILIPP FINITZER, subjects of the Kingdom of Hungary, and residents of Budapest, Austria-Hungary, have invented certain new and useful Improvements in the Process of Fermentation for Use in the Manufacture of Yeast and Spirit, of which the following is a clear, full, and exact description.

The present invention relates to processes of fermentation and particularly to that part of the processes involving the propagation of the saccharomyces or yeast fungi, the objects of the invention being to eliminate as far as practicable all element of chance or uncertainty and to secure better and more uniform results followed by a higher yield of alcohol than by processes heretofore practiced.

The invention consists, generally stated, in interrupting the fermentation or acidification of the yeast mash due to the presence of lactic acid bacteria by the addition of sufficient inorganic acid such as sulfuric acid while the lactic acid fermentation is still in active progress, but before the acidification has progressed to an extent which will materially interfere with the vigor of the lactic acid bacteria. The quantity of inorganic acid added is sufficient to substantially stop the lactic acid fermentation without destroying the vitality or vigor of the lactic acid bacteria, the latter thus remaining in the mash in a vigorous condition.

It has heretofore been generally recognized that yeast prospers best in slightly acid solutions because the presence of acids is detrimental to the growth or development of inimical micro-organisms, thus, in prior processes protection of the yeast mash has been sought in the use of lactic acid originated through spontaneous fermentation. In other processes various means for securing antiseptic conditions were employed, or the yeast mash soured by spontaneous lactic acid fermentation was boiled or heated to higher temperatures to kill inimical bacteria before the yeast mash was mixed with the starting yeast or sulfuric acid was added as a substitute for the lactic acid process.

It has been ascertained by the inventors that the fermentation proceeds much more advantageously and more alcohol is obtained from the same quantity of sugar if at the time of the yeast fermentation lactic acid bacteria are present, because the yeast is protected against the invasion or multiplication of inimical bacteria by the presence of vigorous lactic acid bacteria and yeast fermentation is promoted by the symbiosis of said vigorous lactic acid bacteria and the saccharomyces. It is to be noted, however, that lactic acid in excess produced by lactic acid bacteria is just as harmful as is the product of alcoholic fermentation; the alcohol, as proven by scientific research at first stops the growth of the saccharomyces, then reduces its fermentative power and finally stops the fermentation altogether. This is also true with respect to the lactic acid bacteria which are weakened by the presence of an excess of lactic acid and in the process as heretofore practiced with lactic acid fermentation this excess invariably occurred. Such prior processes pushed the acidification to a degree where 20 cubic centimeters of the yeast mash filtrate required 2.0–2.4 cubic centimeters of normal caustic soda or more, for neutralization.

In the present invention when the acidity of the yeast mash has reached a certain degree and while the lactic acid bacteria are in full vigor sufficient sulfuric acid or similarly acting inorganic acid is added to interrupt the lactic acid fermentation without killing or otherwise materially impairing the vigor of the milk acid bacteria.

A practical example of the process of the present invention is as follows: In starting the process of manufacture the yeast mash is prepared of a mixture of equal quantities of unmalted cereal and malt (rye flour and bruised malt for example) the quantity of this mixture being about 5% dry measure of the original substance of the mash. The mixture is diluted to such degree that if heated as usual to 66–69° centigrade it should have, after two hours of inversion, saccharification of 19–20° (Balling) saccharimeter. While this process of preparation of the yeast mash may be followed throughout the entire course of manufacture, a preferred and somewhat simplified process is to prepare the yeast mash from the main mash, as, for instance, by taking about 5% of the main mash and adding to it when in the yeast butt, so much ground malt that the yeast mash so prepared will show about 19-20° (Balling) saccharimeter after heating up to 66-68° centigrade and after about two hours of inversion.

After the yeast mash is prepared as above, milk acid fermentation is permitted or is caused to take place as usual at 50-62° centigrade and while the fermentation is still of undiminished activity sulfuric acid is added in sufficient quantity to interrupt the lactic acid fermentation without destroying or materially reducing the vitality of the milk acid bacteria. The prepared yeast mash is then cooled down to about 10-20° centigrade, (the desirable temperature for the main fermentation), and compressed yeast or starting yeast is added. The yeast mash is now fermented to 4° saccharimeter (Balling) and after taking out 10% for subsequent use the remainder is added to the cooled main mash for fermentation purposes.

The time when the lactic acid fermentation is to be interrupted by the addition of sulfuric or equivalent inorganic acid is indicated by the acid content and is preferably as soon as 20 cubic centimeters of the yeast mash filtrate require 0.8-1.3 cubic centimeters normal caustic soda for neutralization. These percentages may, under some conditions, be varied, but best results have so far been secured between the limits mentioned.

The sulfuric acid of 66° Baumé to be added is preferably in the proportion of about one hundred cubic centimeters to each one hundred liters of yeast mash of about 20° saccharimeter (Balling).

As hereinbefore indicated, the addition of the sulfuric acid while it interrupts the progress of the lactic acid fermentation does not destroy the lactic acid bacteria, the latter retaining their full vitality and vigor to participate in the fermentation of the yeast and to protect the mash from the invasion or multiplication of inimical bacteria and secondary fermentation resulting therefrom. The percentage of sulfuric acid added may be varied to some extent, depending upon the raw material used for the manufacture of the yeast mash. The amount added in the present process is not sufficient to be dangerous to the yeast and its addition requires no particular precautions, its primary function being to control or prepare the lactic acid bacteria for the performance of their functions in the subsequent fermentation, although it may also serve to supply acid required for the process of fermentation in the mash. In the process of the present invention the percentage of acidity may be less than in ordinary practice, owing to the protection afforded by the lactic acid bacteria which are present in the mash in a vigorous condition.

Other inorganic or mineral acids, for instance, hydrochloric acid, may be employed instead of sulfuric acid, and hence we do not wish to be limited specifically to sulfuric acid.

Otherwise than as hereinbefore stated, the process of manufacture is in no way changed from well known practice.

Having thus described our invention, what we claim and desire to secure by Letters Patent, is:—

1. The improvement in the process of alcoholic fermentation wherein the fermentation due to the presence of lactic acid bacteria is employed which consists in interrupting the spontaneous acidification of the yeast mash due to the lactic acid bacteria by adding inorganic acid sufficient only in quantity to arrest the multiplication of lactic acid bacteria without destroying the vitality of the said bacteria then present in the mash, fermenting the mash with yeast and in adding said yeast mash to the main mash for fermentation.

2. The improvement in the process of alcoholic fermentation which consists in the preparation of a yeast mash by the fermentation due to lactic acid bacteria, said fermentation being interrupted when in a highly active stage and before the addition of the yeast, by adding inorganic acid in quantity insufficient to destroy the vitality of the lactic acid bacteria, fermenting the mash with yeast and in adding the prepared yeast mash to the main mash.

3. The improvement in the process of fermentation of saccharomyces and lactic acid bacteria which consists in interrupting the fermentation due to the presence of lactic acid bacteria when the acidity is such that approximately 20 cubic centimeters of the yeast mash filtrate require 0.8-1.3 cubic centimeters of normal caustic soda for neutralization, by the addition of an inorganic acid, and in subsequently fermenting the mash with yeast and adding said yeast mash to the main mash.

4. The improvement in the process of fermentation which consists in preparing a mash, acidifying said mash by lactic acid fermentation until a certain degree of lactic acidity has been reached, then interrupting the lactic acid fermentation without destroying the lactic acid bacteria by the addition of an inorganic acid and subsequently subjecting the mash containing the lactic acid bacteria to yeast fermentation, and adding the yeast mash to the main mash.

DESIDER FORSTER.
PHILIPP FINITZER.

Witnesses:
LAJO GYULA,
TYSTAN JANOS.